United States Patent
Luo et al.

(10) Patent No.: US 10,042,111 B2
(45) Date of Patent: Aug. 7, 2018

(54) LIGHT GUIDING UNIT, LIGHT GUIDING DEVICE, AND LIGHTING AND/OR SIGNAL INDICATING DEVICE

(71) Applicant: Valeo Lighting Hubei Technical Center Co. Ltd, Wuhan (CN)

(72) Inventors: Ji Luo, Wuhan (CN); Chen Chen, Wuhan (CN); Pingwu Yang, Wuhan (CN); Haiqing Zhou, Wuhan (CN)

(73) Assignee: VALEO LIGHTING HUBEI TECHNICAL CENTER CO., LTD., Wuhan, Hubei (CN)

( * ) Notice: Subject to any disclaimer, the term of this patent is extended or adjusted under 35 U.S.C. 154(b) by 0 days.

(21) Appl. No.: 15/228,235

(22) Filed: Aug. 4, 2016

(65) Prior Publication Data

US 2017/0038521 A1  Feb. 9, 2017

(30) Foreign Application Priority Data

Aug. 7, 2015  (CN) .......................... 2015 1 0479181

(51) Int. Cl.
*F21V 8/00* (2006.01)
*F21V 7/00* (2006.01)
(Continued)

(52) U.S. Cl.
CPC ............ *G02B 6/0078* (2013.01); *F21S 43/15* (2018.01); *F21S 43/239* (2018.01); *F21S 43/243* (2018.01);
(Continued)

(58) Field of Classification Search
CPC ...... G02B 6/002; G02B 6/003; G02B 6/0051; G02B 6/0055; G02B 6/0078; G02B 6/0083; F21V 7/0091; F21V 13/04; F21S 48/2225
See application file for complete search history.

(56) References Cited

U.S. PATENT DOCUMENTS 8,007,149 B2    8/2011  Nagasawa et al.
2006/0209417 A1 9/2006  Kojima
(Continued)

FOREIGN PATENT DOCUMENTS

EP    2019257 A1    1/2009
GB    2 324 364 A    10/1998

OTHER PUBLICATIONS

European Search Report dated Mar. 3, 2017 in European Patent Application No. 16 18 2775.

*Primary Examiner* — Thomas M Sember
(74) *Attorney, Agent, or Firm* — Oblon, McClelland, Maier & Neustadt, L.L.P.

(57) ABSTRACT

A light guiding unit, light guiding device, and lighting and/or signal indicating device comprising a light entry side, for receiving incident light; a light exit side, opposite the light entry side, for emitting emergent light; and a first reflecting side, on which is disposed a reflecting face for reflecting, towards the light exit side, at least a portion of light that has entered through the light entry side, wherein the first and second entry faces have curved shapes and are disposed on the light entry side, the first and second entry faces receiving a first incident and a second incident light portion respectively, and collimating the first incident and second incident light portion respectively in a plane lying along a first direction, wherein one of the first and second entry faces guides the first or second incident light portion corresponding thereto towards the reflecting face on the first reflecting side.

20 Claims, 4 Drawing Sheets

(51) Int. Cl.
  *F21V 13/04*    (2006.01)
  *F21S 43/15*    (2018.01)
  *F21S 43/239*   (2018.01)
  *F21S 43/243*   (2018.01)
  *F21S 43/249*   (2018.01)
  *F21W 111/00*   (2006.01)
  *F21Y 105/10*   (2016.01)

(52) U.S. Cl.
  CPC .......... *F21S 43/249* (2018.01); *F21V 7/0091* (2013.01); *F21V 13/04* (2013.01); *G02B 6/002* (2013.01); *G02B 6/003* (2013.01); *G02B 6/0051* (2013.01); *G02B 6/0055* (2013.01); *G02B 6/0083* (2013.01); *F21W 2111/00* (2013.01); *F21Y 2105/10* (2016.08)

(56) References Cited

U.S. PATENT DOCUMENTS

| | | |
|---|---|---|
| 2009/0027910 A1 | 1/2009 | Nagasawa et al. |
| 2010/0226127 A1* | 9/2010 | Bigliatti .................. F21V 5/00 362/235 |
| 2010/0238666 A1 | 9/2010 | Ominato et al. |
| 2014/0029284 A1 | 1/2014 | Giraud et al. |

\* cited by examiner

LIGHT GUIDING UNIT, LIGHT GUIDING DEVICE, AND LIGHTING AND/OR SIGNAL INDICATING DEVICE

CROSS-REFERENCE TO RELATED APPLICATIONS

This application claims priority to Chinese application 201510479181.5 filed Aug. 7, 2015, which application is incorporated herein by reference and made a part hereof.

BACKGROUND OF THE INVENTION

1. Field of the Invention

The present invention relates to the field of lighting and signal indicating, in particular to a light guiding unit, a light guiding device, and a lighting and/or signal indicating device.

2. Description of the Related Art

Lighting and/or signal indicating devices are widely used in production and everyday life. In lighting and/or signal indicating devices, it is often necessary to use a light guiding device, such as a light guiding plate, light guiding rod or light guiding strip, to enable light to be diffused and propagated as uniformly as possible. Conventional light guiding devices generally employ a simple flat, straight face as a light receiving face for light to enter. Such a light guiding device has a relatively simple structure, but the uniformity of light diffusion is often somewhat restricted. In particular, in applications involving multiple light sources (such as LED arrays), the uniformity of light that has passed through a light guiding device is often unsatisfactory.

SUMMARY OF THE INVENTION

The object of the present invention is to provide a light guiding unit, a light guiding device, and a lighting and/or signal indicating device, which are capable of improving light uniformity and improving optical efficiency.

The embodiments of the present invention provide a light guiding unit, comprising:
a light entry side, for receiving incident light;
a light exit side, disposed opposite the light entry side, for emitting emergent light; and
a first reflecting side, on which is disposed a reflecting face for reflecting, towards the light exit side, at least a portion of light that has entered through the light entry side,
wherein the first entry face and second entry face have curved shapes, a first entry face and a second entry face are disposed on the light entry side, the first entry face and second entry face receiving a first incident light portion and a second incident light portion respectively, and collimating the first incident light portion and second incident light portion respectively in a plane lying along a first direction,
wherein one of the first entry face and second entry face guides the first incident light portion or second incident light portion corresponding thereto towards the reflecting face on the first reflecting side.

In one embodiment, the first entry face and second entry face both have a convex lens cross sectional shape in a plane lying along a first direction.

In one embodiment, the first entry face and second entry face adjoin each other and have different light guiding directions.

In one embodiment, the first entry face is used for guiding the first incident light portion towards the light exit side, and the second entry face guides the second incident light portion towards the reflecting face on the first reflecting side.

In one embodiment, the first incident light portion or second incident light portion that is guided towards the reflecting face on the first reflecting side has a divergence angle of 10 degrees to 70 degrees.

In one embodiment, the reflecting face on the first reflecting side is a totally reflective reflecting face.

In one embodiment, optical stripes are disposed on the reflecting face on the first reflecting side.

In one embodiment, the light guiding unit also comprises a second reflecting side disposed opposite the first reflecting side, with an additional reflecting face being disposed on the second reflecting side, the first entry face being used for guiding the first incident light portion towards the additional reflecting face, and the second entry face guiding the second incident light portion towards the reflecting face on the first reflecting side.

In one embodiment, the additional reflecting face on the second reflecting side is a totally reflective reflecting face.

In one embodiment, optical stripes are disposed on the additional reflecting face on the second reflecting side.

In one embodiment, the first entry face and/or second entry face has/have a convex cross sectional shape in a plane perpendicular to a plane lying along a first direction.

In one embodiment, the first direction is the thickness direction of the light guiding unit.

In one embodiment, the angle of inclination of the light exit direction of the light guiding unit relative to the optical axis direction of incident light is no greater than 75 degrees.

The embodiments of the present invention also provide a light guiding device, comprising: multiple light guiding units according to any one of the preceding embodiments, disposed side by side on a light receiving side of the light guiding device.

In one embodiment, the light guiding device is integrally formed of the same material.

The embodiments of the present invention also provide a lighting and/or signal indicating device, comprising:
the light guiding device according to the abovementioned embodiment,
a light source, for providing incident light for the light guiding unit.

In one embodiment, the lighting and/or signal indicating device also comprises:
a printed circuit board,
wherein the light source comprises multiple light emitting elements disposed side by side on the printed circuit board, each light emitting element facing the light entry side of one light guiding unit on the light guiding device, and the printed circuit board forming an included angle of not less than 15 degrees relative to the light exit direction of the light guiding unit.

The abovementioned embodiments of the present invention provide a light guiding unit having a first entry face and a second entry face with curved shapes as well as a reflecting face, the light guiding unit being capable of achieving uniform diffusion of incident light and improving optical coupling efficiency.

These and other objects and advantages of the invention will be apparent from the following description, the accompanying drawings and the appended claims.

BRIEF DESCRIPTION OF THE ACCOMPANYING DRAWINGS

DETAILED DESCRIPTION OF THE PREFERRED EMBODIMENTS

The technical solution of the present invention is explained in further detail below by means of embodiments, in conjunction with the accompanying drawings. In this description, identical or similar drawing labels indicate identical or similar components. The following explanation of embodiments of the present invention with reference to the accompanying drawings is intended to explain the overall inventive concept of the present invention, and should not be interpreted as a limitation of the present invention.

According to the overall concept of the present invention, a light guiding unit is provided, comprising: a light entry side, for receiving incident light; a light exit side, disposed opposite the light entry side, for emitting emergent light; and a first reflecting side, on which is disposed a reflecting face for reflecting, towards the light exit side, at least a portion of light that has entered through the light entry side, wherein a first entry face and a second entry face are disposed on the light entry side, the first entry face and second entry face receiving a first incident light portion and a second incident light portion respectively, and collimating the first incident light portion and second incident light portion respectively in a plane lying along a first direction, wherein the first entry face and second entry face have curved shapes, and one of the first entry face and second entry face guides the first incident light portion or second incident light portion corresponding thereto towards the reflecting face on the first reflecting side.

Figure 1:
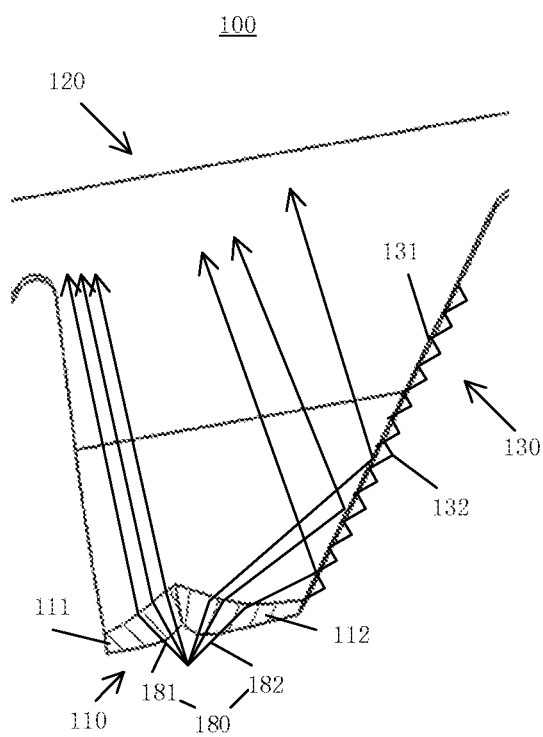
FIG. 1 shows a schematic top view of a light guiding unit according to an embodiment of the present invention.
Figure 2:
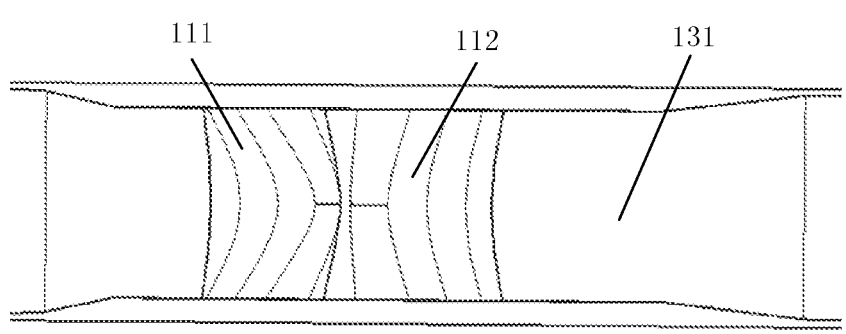
FIG. 2 shows a schematic front view of a light guiding unit according to an embodiment of the present invention.

FIGS. 1 and 2 show a light guiding unit 100 according to an embodiment of the present invention. The light guiding unit 100 comprises: a light entry side 110, for receiving incident light 180; a light exit side 120, for emitting emergent light; and a first reflecting side 130. The light exit side 120 and light entry side 110 are disposed opposite each other and are two opposite sides of the light guiding unit 100 respectively. A light reflecting face 131 is disposed on the first reflecting side 130, for reflecting towards the light exit side 120 at least a portion of light that has entered through the light entry side 110. A first entry face 111 and a second entry face 112 are disposed on the light entry side 110, the first entry face 111 and second entry face 112 receiving a first incident light portion 181 and a second incident light portion 182 respectively, and collimating the first incident light portion 181 and second incident light portion 182 respectively in a plane lying along a first direction. The first entry face 111 and second entry face 112 have curved shapes. The second entry face 112 guides the second incident light portion 182 corresponding thereto towards the light reflecting face 131 on the first reflecting side 130. It should be understood that although the second entry face 112 guides the second incident light portion 182 corresponding thereto towards the light reflecting face 131 on the first reflecting side 130 in the example shown in FIG. 1, in another example, the first entry face 111 may guide the first incident light portion 181 corresponding thereto towards the light reflecting face 131 on the first reflecting side 130.

In an embodiment of the present invention, the first entry face 111 and second entry face 112 collimate the first incident light portion 181 and second incident light portion 182 respectively in a plane lying along a first direction (which is the direction perpendicular to the paper surface in the example shown in FIG. 1, and the vertical direction in FIG. 2); as a result, the first incident light portion 181 and second incident light portion 182 are gathered together in the light guiding unit 100, so that optical loss of incident light is reduced. This is especially beneficial in the case where the light guiding unit 100 is in the form of a plate; in such a case, the structure described above can prevent or reduce emission of incident light from the top face and bottom face of the light guiding unit 100, and propagate towards the light exit side 120 in a concentrated manner, so as to improve the optical efficiency and enhance the contrast.

In one example, in order to achieve the abovementioned collimating effect, the first entry face 111 and second entry face 112 both have a convex lens cross sectional shape in a plane lying along a first direction. It must be explained that the "collimation" referred to in the present application does not mean that collimated light must be completely parallel; rather, it means that the first entry face 111 and second entry face 112 have a positive optical power in a plane lying along a first direction, and are at least capable of causing the divergence directions of incident light passing therethrough to be gathered together. The specific degree of gathering can be determined according to specific design requirements (such as the thickness of the light guiding unit 100 in the first direction).

The use of the combination of the first entry face 111 and second entry face 112 enables as much incident light 180 as possible to be received, to facilitate uniform diffusion thereof in the light guiding unit 100, while the provision of the light reflecting face 131 can change the direction of emergence of light that has entered through the first entry face 111 and second entry face 112. Thus, not only is uniform diffusion of incident light in the light guiding unit 100 ensured, but light entering through the first entry face 111 or the second entry face 112 can emerge in the desired direction (e.g., in substantially the same direction).

In one example, the first entry face 111 and second entry face 112 may adjoin each other and have different light guiding directions. The provision of two entry faces having different light guiding directions on the light entry side 110 can increase the design flexibility with regard to the range of diffusion angles of light in the light guiding unit 100. That is, light can be diffused uniformly in the light guiding unit 100 within a larger angular range.

In one example, as shown in FIG. 1, the first entry face 111 is used for guiding the first incident light portion 181 towards the light exit side 120; the second entry face 112 guides the second incident light portion 182 towards the light reflecting face 131 on the first reflecting side 130. In this case, although the first entry face 111 and second entry face 112 can guide the first incident light portion 181 and second incident light portion 182 respectively in different directions, the first incident light portion 181 and second incident light portion 182 can finally emerge in substantially the same direction and have uniform emergence strength, due to the action of the light reflecting face 131. Alternatively, in another example, the second entry face 112 may guide the second incident light portion 182 towards the light exit side 120, while the first entry face 111 guides the first incident light portion 181 towards the light reflecting face 131 on the first reflecting side 130.

As stated above, the shapes of the first entry face 111 and second entry face 112 may be designed according to the desired light deflection direction. An example of how the shape of the first entry face 111 is calculated is given below. First of all, the angle through which the first incident light portion 181 must be deflected by the first entry face 111 can be determined according to the desired uniformity of emergent light. The shape of the first entry face 111 may be designed as an irregular curved surface; in other words, each point on the first entry face 111 may have its own independent light deflection angle. This can provide as much freedom as possible in terms of optical design, so as to achieve better light uniformity. To this end, the first entry face 111 may be divided into a number of units (e.g. small pieces) having their own independent light deflection angles; in other words, the first entry face 111 may be regarded as being formed of multiple such units pieced together. For each unit on the first entry face 111, the direction of incidence of light and the direction in which it leaves the first entry face 111 may be set according to the design target for light uniformity as well as optical principles (e.g. the law of reflection and the law of refraction). For example, the first entry face 111 may be cut along a certain direction (e.g. along the abovementioned first direction, or a horizontal direction, vertical direction, etc.) in order to obtain a curved profile. The plane in which the curved profile lies may be defined as the X-Y plane, and the curved profile may be approximately formed by connecting together multiple straight-line section units one by one. The length of each straight-line section unit in the X-direction (also called the X step length) may be defined as $STEP_X$, the length in the Y-direction (also called the Y step length) may be defined as $STEP_Y$, and the ratio of $STEP_Y$ to $STEP_X$ is referred to as the gradient SLP of the straight-line section unit. If the gradient of each straight-line section unit is determined, then the shape of the curved profile can be determined. When each straight-line section unit is sufficiently small, an approximately smooth curved profile shape can be obtained. The abovementioned X step length and Y step length can be chosen according to the calculation precision requirements, e.g. 0.1 mm, 0.05 mm, 0.01 mm, etc.

The gradient of the straight-line section can be determined by means of optical laws. As an example, the gradient of the straight-line section may be calculated by the following formula:

$$SLP = \tan\left(-\arctan\left(\frac{\sin\theta}{-\frac{1}{n}+\cos\theta}\right) \times \frac{180}{\pi} + \alpha\right) \quad (1)$$

In the formula (1) above, SLP is the gradient of the straight-line section unit, tan is the tangent operator, arctan is the inverse tangent operator, n is the refractive index of the light guiding unit, $\alpha$ is the angle of incidence of light on the straight-line section at the first incident light portion, and $\theta$ is the angle of deflection (i.e. the included angle of the angle of incidence and the angle of refraction) of incident light after passing through the straight-line section unit, wherein each angle is calculated in units of degrees (°).

The shape of the abovementioned curved profile can be determined by calculating the gradients of the straight-line section units one by one; the shapes of curved profiles obtained by cutting the first entry face 111 along other directions can also be calculated in the same way. The shape of the entire first entry face 111 can then be calculated on the basis of the shapes of multiple curved profiles obtained by cutting the first entry face 111 along multiple directions. The division into the abovementioned straight-line section units and the choice of curved profiles can be set according to design precision and requirements.

Only one example of how the shape of the first entry face 111 is calculated is given above; in practice, the calculation process might require repeated adjustment of parameters according to the design of light ray distribution in order to be completed. The shape of the second entry face 112 may be calculated in substantially the same way as that described above; the specific process will not be repeated.

In one example, the first incident light portion 181 or second incident light portion 182 that is guided towards the light reflecting face 131 on the first reflecting side 130 may have a divergence angle of 10 degrees to 70 degrees, e.g. 30 degrees, 40 degrees, etc.

As an example, the light reflecting face 131 on the first reflecting side 130 may be a totally reflective reflecting face. This can effectively increase the optical efficiency of light during propagation in the light guiding unit 100. To realize a totally reflective reflecting face, the shapes and relative positions of the light reflecting face 131 and the second entry face 112 (or first entry face 111) can be set so that light coming from the second entry face 112 (or first entry face 111) satisfies the conditions for total reflection at the reflecting face 131.

In one example, optical stripes 132 may be disposed on the light reflecting face 131 on the first reflecting side 130. The optical stripes 132 can increase diffusion of light in the light guiding unit 100, to assist in achieving uniform distribution of emergent light.

Figure 3:
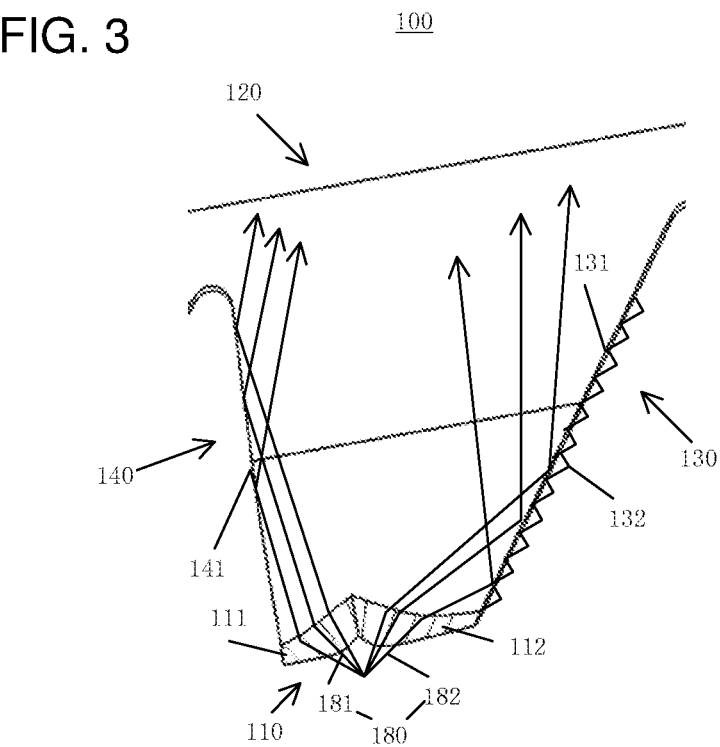
FIG. 3 shows a schematic top view of a light guiding unit according to another embodiment of the present invention.

In one example, as shown in FIG. 3, the light guiding unit 100 may also comprise a second reflecting side 140 disposed opposite the first reflecting side 130, with an additional reflecting face 141 being disposed on the second reflecting side 140. In this case, the first entry face 111 and second entry face 112 can guide different incident light portions towards the light reflecting face 131 on the first reflecting side 130 and the additional reflecting face 141 on the second reflecting side 140 respectively. As an example, the first entry face 111 is used for guiding the first incident light portion 181 towards the additional reflecting face 141; the second entry face 112 guides the second incident light portion 182 towards the light reflecting face 131 on the first reflecting side 130. Such a dual-reflecting-face structure can further increase the diffusion range and uniformity of light in the light guiding unit 100. However, this is not necessary; the light guiding unit 100 may also have a single-reflecting-face structure, i.e. with a reflecting face disposed on only one side of the light guiding unit 100.

In one example, similarly to the light reflecting face 131, the additional reflecting face 141 on the second reflecting side 140 may also be a totally reflective reflecting face. As an example, optical stripes 132 may also be disposed on the additional reflecting face 141 on the second reflecting side 140, to increase diffusion of light in the light guiding unit 100, to assist in achieving uniform distribution of emergent light.

In one example, the first entry face 111 and/or second entry face 112 has/have a convex cross sectional shape in a plane perpendicular to a plane lying along a first direction (e.g. in the plane parallel to the paper surface in the example of FIG. 1, and in a horizontal plane in FIG. 2). In this example, the first entry face 111 and/or second entry face 112 not only has/have a collimating action on incident light in the plane lying along the first direction, but also has/have a certain gathering action on a light beam in a plane perpendicular to the plane lying along the first direction. This can provide more flexibility for the design of the light guiding unit 100.

However, the curved shapes of the first entry face 111 and second entry face 112 are not limited to this, but may be calculated on the basis of the direction of incidence of incident light on the light guiding unit 100 as well as the desired direction of emergence and range of emergent light. As an example, the curved shapes of the first entry face 111 and second entry face 112 may be formed by smooth curved surfaces, or formed by piecing together multiple plane sections or curved surface sections; this can reduce the processing difficulty.

In one example, the first direction may be the thickness direction of the light guiding unit 100, such as the direction perpendicular to the paper surface in FIG. 1, or the vertical direction in FIG. 2. When the light guiding unit 100 is in the form of a plate, such a design is especially beneficial.

By means of the light guiding unit 100 according to embodiments of the present invention, the light exit direction of emergent light can be deflected by any desired angle relative to the direction of incident light, while uniformly diffusing incident light. For example, it can be ensured that the angle of inclination of the light exit direction of the light guiding unit 100 relative to the optical axis direction of incident light is no greater than 75 degrees. This provides flexibility for the arrangement of light sources or other optical elements in lighting and/or signal indicating devices.

Figure 4:
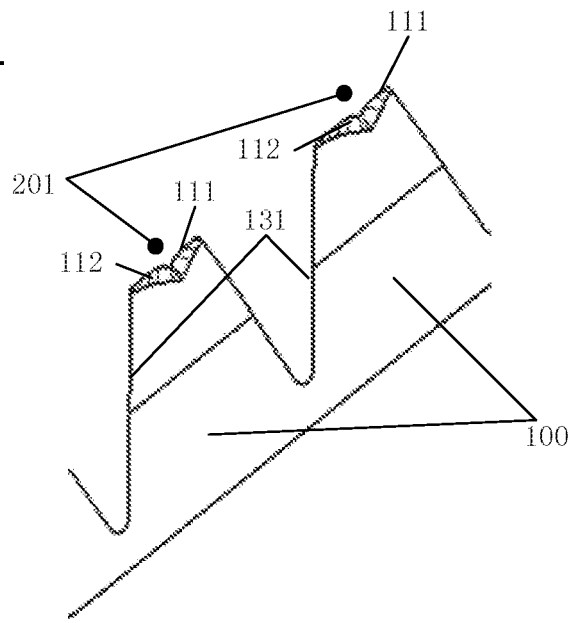
FIG. 4 shows schematically two adjacent light guiding units.

Multiple light guiding units 100 according to embodiments of the present invention may be used together. For example, multiple light guiding units 100 may be arranged side by side, especially in a system of multiple light sources. FIG. 4 shows two light guiding units 100 arranged side by side. Each light source 201 corresponds to one light guiding unit 100, i.e. light emitted by each light source 201 enters through one light guiding unit 100. In such a case, the light guiding unit 100 can cause light emitted from the corresponding light source 201 to be diffused uniformly therein; good light uniformity can be maintained even at the position where the two adjacent light guiding units 100 are connected.

Figure 5:
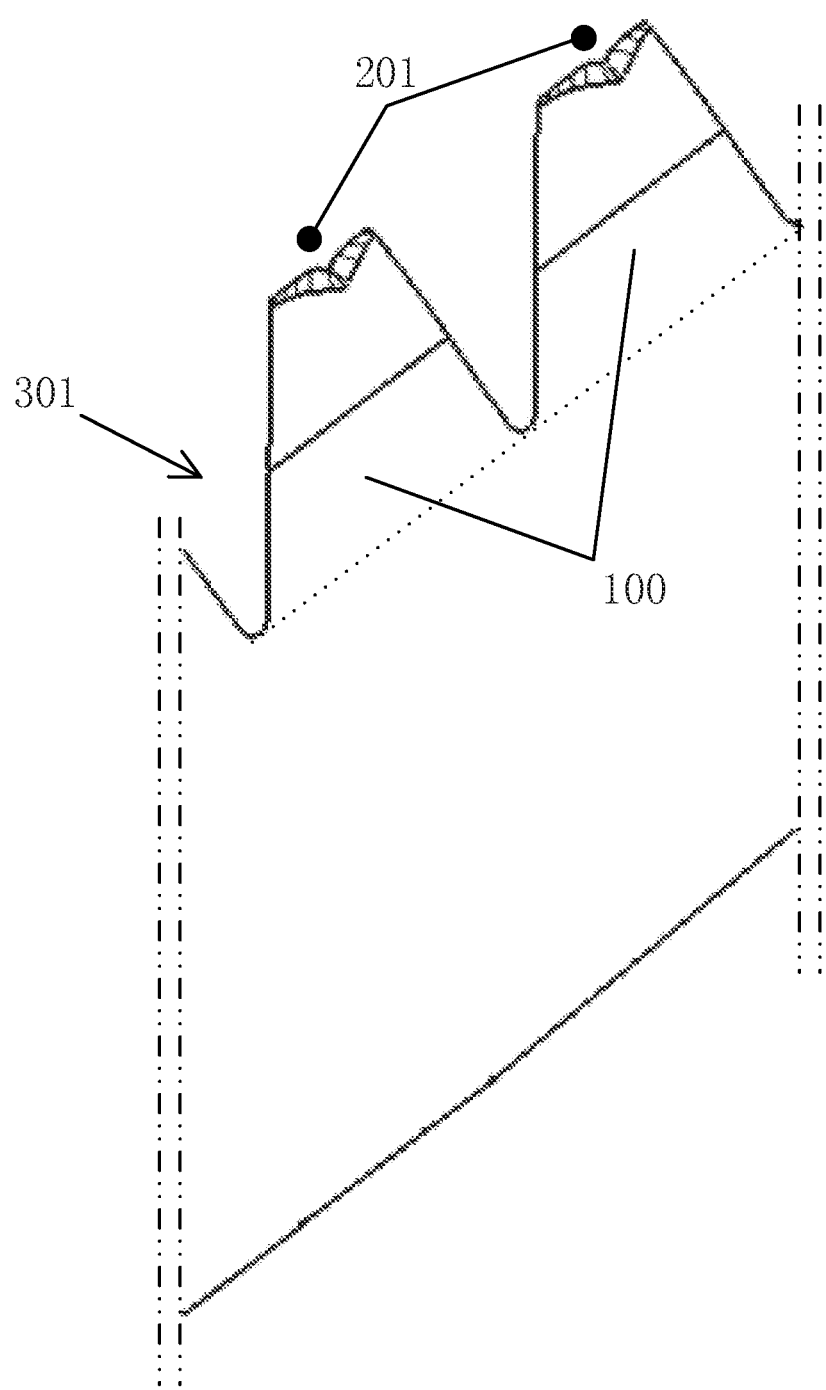
FIG. 5 shows schematically part of a light guiding device according to an embodiment of the present invention.

The embodiments of the present invention also provide a light guiding device 300. As FIG. 5 shows, the light guiding device 300 comprises: multiple light guiding units 100 according to any one of the abovementioned embodiments, disposed side by side on a light receiving side 301 of the light guiding device 300. Since the light guiding units 100 can effectively distribute and uniformly diffuse incident light, the light uniformity and optical efficiency in the light guiding device 300 can be improved. As an example, the light guiding units 100 may be used as inlets for light on the light guiding device 300.

As an example, the light guiding device 300 may be integrally formed of the same material, i.e. the light guiding units 100 and the light guiding device 300 are a single body. This enables the light guiding device 300 to be formed by a simple process. However, the present invention is not limited to this; in another example, the light guiding unit 100 may also be disposed on the light receiving side 301 of the light guiding device 300 by adhesion, etc.

The embodiments of the present invention also provide a lighting and/or signal indicating device, comprising: a light guiding device 300 according to the abovementioned embodiment and a light source 201, the light source 201 being used to provide incident light for the light guiding unit 100.

Figure 6:
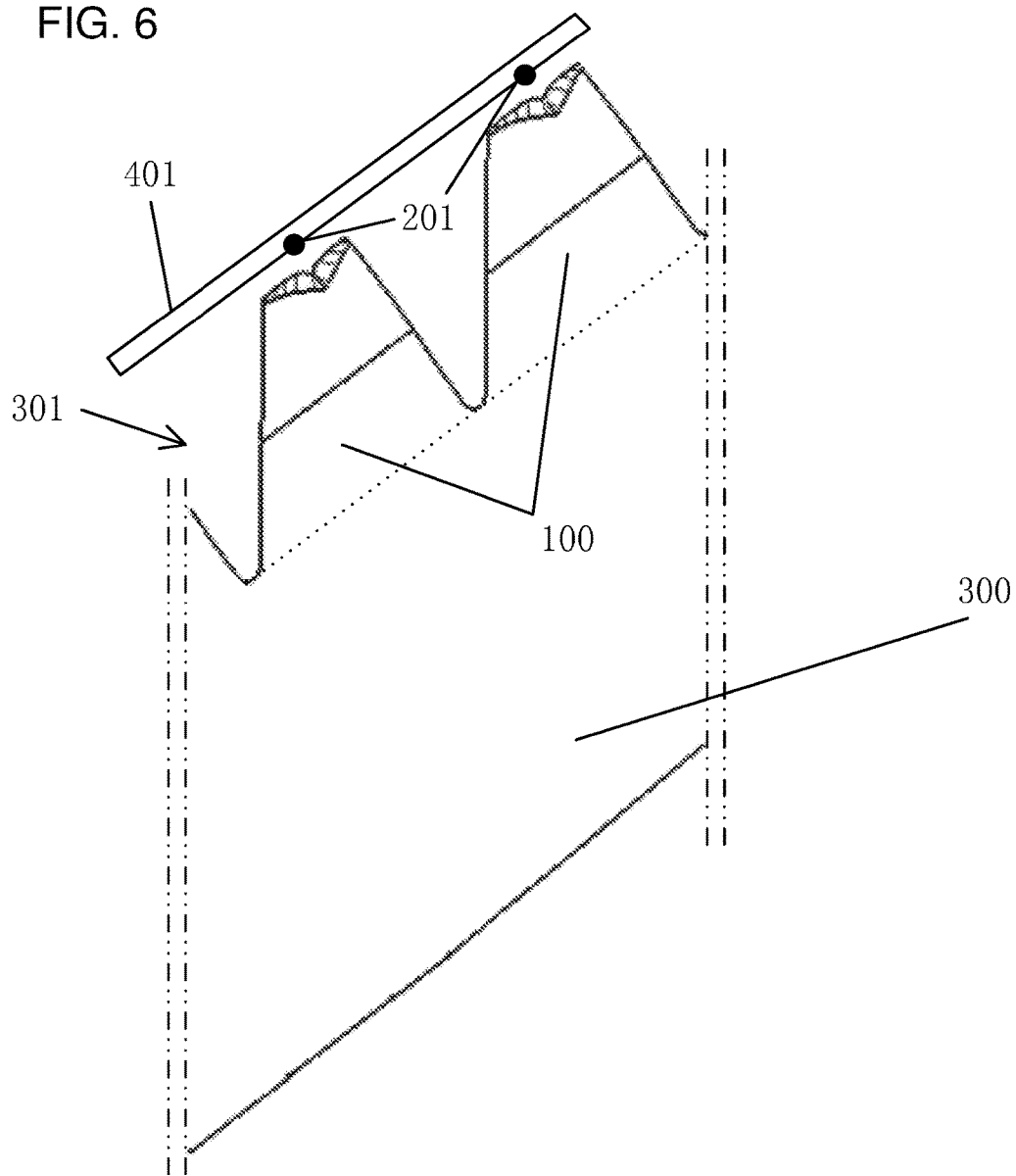
FIG. 6 shows schematically the positional relationship between light guiding units and light sources carried on a printed circuit board.

In one example, the lighting and/or signal indicating device may also comprise a printed circuit board 401 (FIG. 6), the light source 201 comprising multiple light emitting elements 202 disposed side by side on the printed circuit board 401, each light emitting element 202 facing the light entry side 110 of one light guiding unit 100 on the light guiding device 300. Since the light guiding unit 100 can cause the light exit direction of emergent light to be deflected by any desired angle relative to the optical axis of incident light, while ensuring that incident light is uniformly diffused, the light entry side 110 of the light guiding unit 100 can face any desired direction. Thus, under the condition of ensuring that each light emitting element 202 faces the light entry side 110 of a light guiding unit 100 on the light guiding device 300, the printed circuit board 401 used to carry the light emitting elements 202 may form a large angle of inclination with respect to a light exit direction, e.g. an included angle of not less than 15 degrees relative to the light exit direction of the light guiding unit 100. In the case where light emerging from the light guiding unit 100 has a certain angle of divergence, a principal direction of emergence of the emergent light (e.g. along an optical axis of emergence) is taken to be the light exit direction. Furthermore, the light entry side 110 of the light guiding unit 100 may be arranged so as to be close to the light emitting elements 202 positioned on the printed circuit board 401, as shown in FIG. 6; this can also increase the optical coupling efficiency. This also provides greater freedom with regard to the way in which the printed circuit board 401 is arranged, in order to satisfy different requirements of the structural design.

Since the light emerging from the light guiding unit 100 has good directionality, uniform light intensity and low light loss, the light emerging from the abovementioned lighting and/or signal indicating device will have good uniformity and contrast, and therefore have an outstanding light-up effect.

The light guiding unit, light guiding device, and lighting and/or signal indicating device according to embodiments of the present invention may for example be used for lighting and signal indicating in vehicles, and may also be widely used in other lighting and/or signal indicating fields, e.g. in advertising board illuminating lights, etc.

Although the present invention has been explained in conjunction with the accompanying drawings, the embodiments disclosed in the accompanying drawings are intended to provide an exemplary illustration of preferred embodiments of the present invention, and must not be interpreted as a limitation of the present invention. In order to describe the required components clearly, the proportions in the schematic accompanying drawings do not represent the relative proportions of actual components.

Although some embodiments of the overall concept of the present invention have been shown and explained, those skilled in the art will understand that changes may be made to these embodiments without departing from the principles and spirit of the overall inventive concept. The scope of the present invention is defined by the claims and their equivalents.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light guiding unit, comprising:
   a light entry side configured to receive incident light;
   a light exit side, disposed opposite said light entry side, configured to emit emergent light based on the received incident light; and
   a first reflecting side on which is disposed a reflecting face configured to reflect, towards said light exit side, at least a portion of light that has entered through said light entry side,
   wherein a first entry face and a second entry face are disposed on said light entry side, said first entry face and said second entry face being configured to receive a first incident light portion and a second incident light portion, respectively, and to collimate said first incident light portion and said second incident light portion respectively in a plane lying along a first direction,
   wherein said first entry face and said second entry face have curved shapes,
   wherein one of said first entry face and said second entry face guides said first incident light portion or said second incident light portion corresponding thereto towards said reflecting face on said first reflecting side, and
   wherein the other of said first entry face and said second entry face does not guide said first incident light portion or said second incident light portion corresponding thereto towards said reflecting face on said first reflecting side.

2. The light guiding unit according to claim 1, wherein said first entry face and said second entry face both have a convex lens cross sectional shape in the plane lying along said first direction.

3. The light guiding unit according to claim 2, wherein said first direction is a thickness direction of said light guiding unit.

4. The light guiding unit according to claim 2, wherein an angle of inclination of a light exit direction of said light guiding unit relative to an optical axis direction of the incident light is no greater than 75 degrees.

5. The light guiding unit according to claim 1, wherein said first entry face and said second entry face adjoin each other and have different light guiding directions.

6. The light guiding unit according to claim 1, wherein said first entry face is configured to guide said first incident light portion towards said light exit side, and said second entry face is configured to guide said second incident light portion towards said reflecting face on said first reflecting side.

7. The light guiding unit according to claim 1, wherein said first incident light portion or said second incident light portion that is guided towards said reflecting face on said first reflecting side has a divergence angle of 10 degrees to 70 degrees.

8. The light guiding unit according to claim 1, wherein said reflecting face on said first reflecting side is a totally reflective reflecting face.

9. The light guiding unit according to claim 1, wherein optical stripes are disposed on said reflecting face on said first reflecting side.

10. The light guiding unit according to claim 1, further comprising:
    a second reflecting side disposed opposite said first reflecting side, with an additional reflecting face being disposed on said second reflecting side, said first entry face being configured to guide said first incident light portion towards the additional reflecting face, and said second entry face being configured to guide said second incident light portion towards said reflecting face on said first reflecting side.

11. The light guiding unit according to claim 10, wherein said additional reflecting face on said second reflecting side is a totally reflective reflecting face.

12. The light guiding unit according to claim 10, wherein optical stripes are disposed on said additional reflecting face on said second reflecting side.

13. The light guiding unit according to claim 1, wherein said first entry face and/or said second entry face has/have a convex cross sectional shape in a plane perpendicular to the plane lying along said first direction.

14. The light guiding unit according to claim 1, wherein said first direction is a thickness direction of said light guiding unit.

15. The light guiding unit according to claim 1, wherein an angle of inclination of a light exit direction of said light guiding unit relative to an optical axis direction of the incident light is no greater than 75 degrees.

16. A light guiding device, comprising:
    multiple light guiding units according to claim 1, disposed side by side on a light receiving side of said light guiding device.

17. The light guiding device according to claim 16, wherein said light guiding device is integrally formed of the a same material.

18. A lighting and/or signal indicating device, comprising:
    said light guiding device according to claim 17; and
    a light source configured to provide incident light for at least one of said light guiding units of said light guiding device.

19. A lighting and/or signal indicating device, comprising:
    said light guiding device according to claim 16; and
    a light source configured to provide the incident light for at least one of said light guiding units of said light guiding device.

20. A lighting and/or signal indicating device according to claim 19, further comprising:
    a printed circuit board,
    wherein said light source includes multiple light emitting elements disposed side by side on said printed circuit board, each said light emitting element facing said light entry side of a respective one of said light guiding units on said light guiding device, and said printed circuit board forming an included angle of not less than 15 degrees relative to a light exit direction of said light guiding unit.

* * * * *